April 10, 1962 H. H. CLINTON 3,029,418

WAVE SIGNAL RECEIVER MONITOR

Filed Sept. 6, 1957 2 Sheets-Sheet 1

INVENTOR.
Henry H. Clinton
BY Diggins & LeBlanc
ATTORNEYS

April 10, 1962 H. H. CLINTON 3,029,418

WAVE SIGNAL RECEIVER MONITOR

Filed Sept. 6, 1957 2 Sheets-Sheet 2

INVENTOR.

Henry H. Clinton

BY Diggins & LeBlanc

ATTORNEYS

United States Patent Office 3,029,418
Patented Apr. 10, 1962

3,029,418
WAVE SIGNAL RECEIVER MONITOR

Henry H. Clinton, Vernon, Conn., assignor to C-E-I-R, Inc., a corporation of Delaware Filed Sept. 6, 1957, Ser. No. 682,383
2 Claims. (Cl. 340—202)

This invention relates to improvements in intelligence transmission systems and more particularly to systems in which intelligence is transmitted in the form of pulses and is received and converted into visual intelligence. In its most specific aspect, the invention relates to a system and apparatus for indicating at a remote point the tuning condition of wave signal receivers.

In recent years it has become increasingly important for radio and television advertisers to be able to determine the listening habits of wave signal receiver users so as to analyze the effectiveness of radio and television advertising. While numerous schemes have been employed for this purpose, it is now generally agreed that instrumented methods of determining the listening or viewing habits of users is the only satisfactory way of obtaining accurate information. In many cases it is desirable that the information with respect to the tuning condition of wave signal receivers be instantaneously available at a central station or at a central point remote from the place or places where the receivers are located. This permits the analysis organization which controls such central station or central point and which prepares an analysis of the listening or viewing habits of wave signal receiver users, to have the information to prepare reports with a minimum of delay.

Various types of instrumented systems for securing this information have been proposed and these systems have utilized varying amounts of equipment of varying degrees of complexity. For the most part, the methods of which I am aware have been subject to one or more disadvantages which, to date, have prevented their actual commercial use.

According to the method used in one system, the tuner of the wave signal receiving apparatus is utilized to rotate a switch or some mechanical drive which in one way or another controls a signal which is transmitted to the central station. Because of the varying types of tuners used in wave signal receivers, however, this presents a practical economic problem in that it is often extremely difficult to provide a mechanical take-off from the tuner shaft. In many instances the accessible portion of the tuner shaft consists of a stub no more than approximately ⅛ inch in length, so that it is impractical to utilize many of the numerous types of switching arrangements which have been proposed in the past. Another disadvantage encountered with instrumented systems which have been previously proposed has been the fact that they are normally fairly complex and utilize a very considerable amount of expensive equipment. The large amount of equipment utilized makes it difficult to insert the unit into existing radio or television receiver cabinets, and at the same time presents a serious cost problem.

The present invention is directed to a system for providing remote indication of the tuning condition of wave signal receivers wherein a connection is made to the tuner shaft, but not such a connection as requires the transfer of any power from the shaft. According to the invention a second shaft is driven by a separate power source under control of the tuner shaft and this second shaft is used to produce a series of pulses which by their number convey information as to the tuning condition of the wave signal receiver.

It is accordingly a primary object of the present invention to provide an improved apparatus for producing an indication or record of the listening habits of wave signal receiver users.

It is another object of the invention to provide an apparatus for producing an indication or record of the listening habits of wave signal receiver users which is adapted to be easily attached to most types of radio and television receivers without major modification of the tuning arrangements in such receivers.

It is another object of the present invention to provide a relatively simple and inexpensive apparatus for producing an indication or record of the listening habits of wave signal receiver users wherein the information is conveyed to a central point.

It is a further object of the invention to provide a system for remotely indicating the tuning condition of wave signal receivers which transmits intelligence in the form of pulses generated by a rotating member whose rotation is discontinuous and controlled by the rotation of the tuning element of the wave signal receiver.

It is a still further object of the invention to provide a system of the type specified wherein a mechanical connection is made to the tuning element of the wave signal receiver but substantially no mechanical power is derived from this connection.

These and further objects and advantages of the invention will become more apparent upon reference to the following specification and claims and appended drawings wherein:

FIGURE 1 is a perspective partly exploded view showing the tuner shaft follow-up system;

FIGURE 1*a* is a vertical section showing one method of attaching the follow-up system to the tuner shaft;

FIGURE 1*b* is a vertical section showing another method of attaching the follow-up system to the tuner shaft;

Figures 1, 1A, 1B:
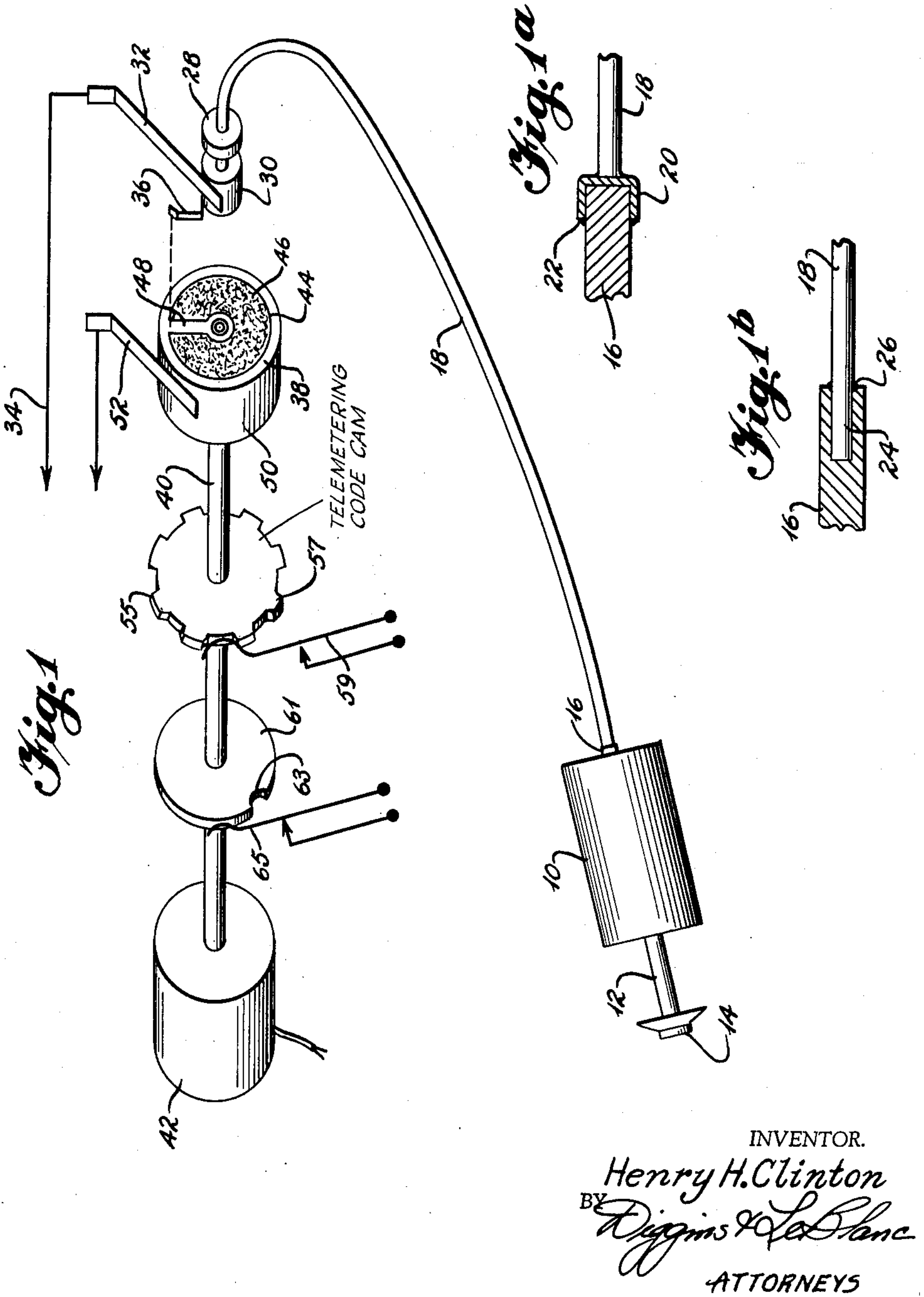

Referring to FIGURE 1, there is shown a television receiver tuner 10 of a conventional type having a tuner shaft 12 actuated by a suitable knob 14. A small end 16 of the tuner shaft 12 extends from the rear end of the tuner and has a flexible cable 18 attached thereto.

The shaft 12 is the coarse tuning shaft of the television receiver which conventionally is detented or indexed into any one of a preselected plurality of positions. This shaft could also obviously be the tuning shaft of a capacitor in a radio receiver.

Referring to FIGURE 1*a*, there is shown one method of attaching the flexible cable to the tuner shaft. The cable 18 has a cap 20 attached thereto and this cap fits over and is soldered to the tuner shaft end as at 22. Referring to FIGURE 1*b*, there is shown an alternative method of effecting such a connection. According to this arrangement the tuner shaft end 16 is provided with a bore 24 in which the end of the flexible cable 18 is received and the cable is soldered to the shaft end 16 at 26.

The other end of the flexible cable 18 is supported in a suitable bearing 28 and carries a metal cylinder 30. The cylinder 30 is contacted by a resilient contact or brush 32 which is connected to a source of A.C. power supply through the line 34 and suitable other circuitry presently to be described. A contact finger 36 extends radially from the metal cylinder 30 for a purpose presently to be described.

The backlash in the flexible cable must be kept to a minimum and it will be seen that this end is served by the fact that the flexible cable drives only the very light cylinder 30 with its attached finger 36. As a further precaution in assuring a minimum of backlash the flexible cable should be double wound and must be kept short.

A cylinder 38 of insulating material, such as a suitable synthetic resin, is mounted on a shaft 40 driven by a small synchronous motor 42. The face 44 of cylinder 38 has a circular contact plate 46 mounted thereon and this contact plate is provided with a radial cutaway portion or slot 48 which is slightly wider than the contact finger 36. The contact finger 36 normally slides across the contact plate 46, although it is shown in an exploded position in FIGURE 1 for purposes of clarity. The cylinder 38 has a slip ring 50 mounted over its outer surface and this engages a resilient contact 52. The shaft 40 carries a code cam 55 having a series of lugs 57 which open a microswitch 59 as the shaft 40 rotates. This shaft 40 also carries an "off" cam 61 having a depression 63 at one portion thereof. The resilient arm of a suitable microswitch 65 bears against the edge of the "off" cam 61 and opens the switch 65 when the depression 63 receives the microswitch arm.

Figures 2, 3:
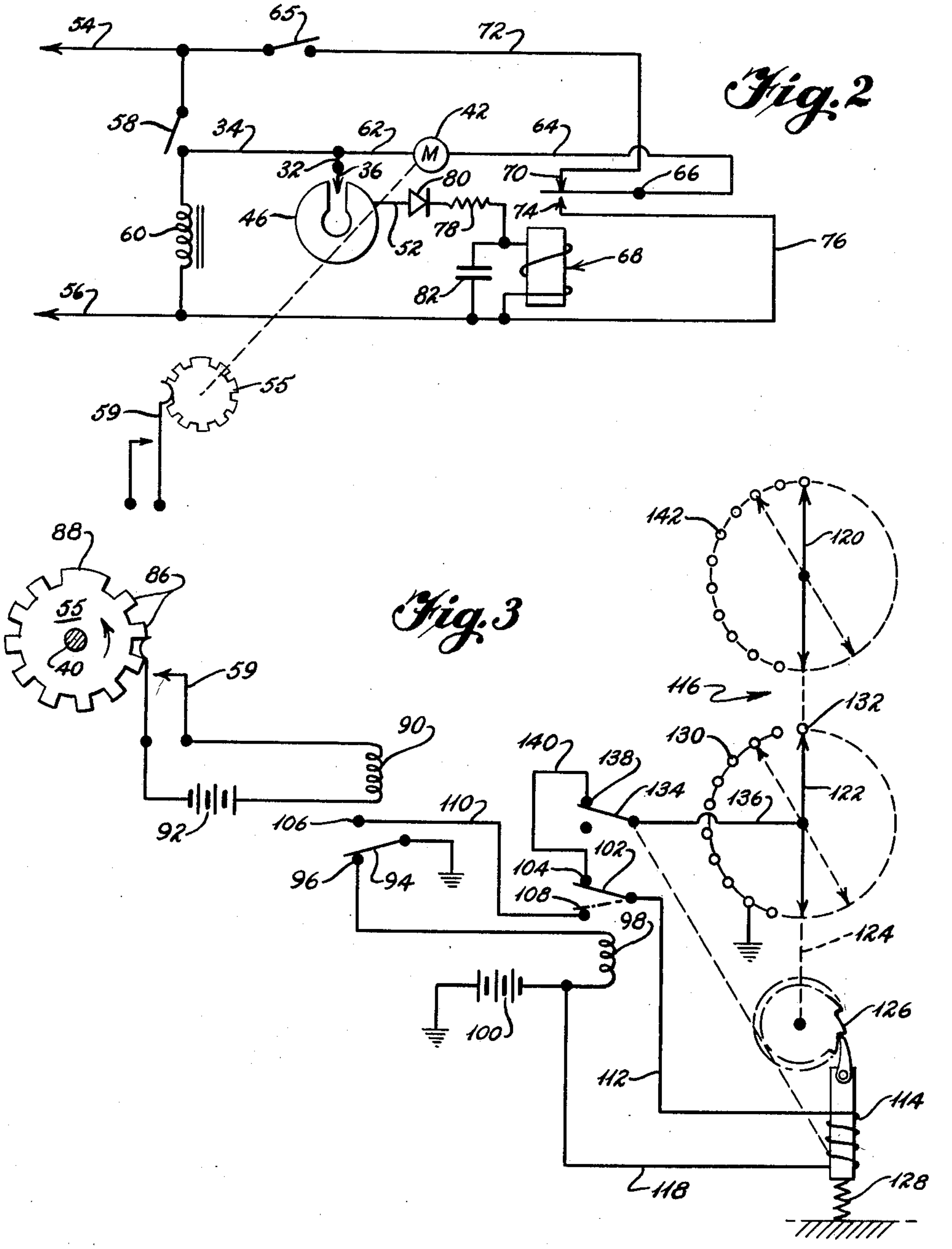
FIGURE 2 is a circuit diagram of the follow-up system.
FIGURE 3 is a circuit diagram of the pulse producing unit and step switches.

Referring to FIGURE 2 there is shown a circuit diagram of the follow-up system. Power supply lines 54 and 56 are connected in the conventional manner to the television receiver on-off switch 58 and the television receiver power transformer primary 60. The finger 36 on the metal cylinder 30 is connected through the resilient contact 32 and conductor 34 to one side of the television receiver power transformer primary 60. This same resilient contact 32 is also connected to one terminal of the motor 42 through conductor 62. The other terminal of the motor 42 is connected through conductor 64 to the movable arm 66 of a motor control relay 68. The upper terminal 70 of this relay is connected through conductor 72 to one side of the "off" switch 65. The other side of "off" switch 65 is connected to the power line 54. The lower stationary contact 74 of relay 68 is connected by line 76 to the lower terminal of the motor control relay winding and to the power line 56. The other terminal of the winding of relay 68 is connected through a current limiting resistor 78 and diode 80 to the resilient contact 52 which establishes a connection to the contact plate 46. A relatively large condenser 82 is connected across the relay 68 for a purpose presently to become apparent.

The operation of the follow-up system is as follows: Let it be assumed that the television receiver tuner shaft 12 is tuned to a specific channel which places the finger 36 on metal cylinder 30 in contact with the contact plate 44. That is to say, the finger 36 is not aligned with slot 48. When the television receiver "on-off" switch 58 is now turned on, the motor control relay 68 is immediately energized through the following circuit; power line 54, "on-off" switch 58, conductors 34 and 32, finger 36, contact plate 46, resilient contact 52, diode 80, resistor 78, motor control relay 68, and power line 56. This causes the movable arm 66 of motor control relay 68 to contact the lower contact 74 to supply power to the motor 42 through the following circuit; power supply line 54, "on-off" switch 58, conductors 34 and 62, motor 42, conductor 64, movable arm 66, stationary contact 74, and conductors 76 and 56.

At the same time that the motor control relay 68 is energized the capacitor 82 is charged through the diode 80. When the motor 42 brings the finger 36 into alignment with the slot 48 in contact plate 46, the circuit energizing the motor control relay 68 is broken, releasing movable arm 66 from lower stationary contact 74 and allowing contact to be made between the movable arm and the upper stationary contact 70. Because of the charge on condenser 82, the motor control relay has a slow release and the motor continues to run for a very short period of time after the contact between finger 36 and contact plate 46 is broken. This prevents arcing between these two contacts. After the motor control relay 68 releases the movable arm 66, the current supply to the motor is terminated and the motor stopped. It will thus be apparent that as the tuner shaft 12 and finger 36 are rotated, the motor causes the shaft 40 to follow this rotation, so that for every position of the tuner shaft 12 the follower shaft 40 assumes a similar position, rotating the code cam 55 and the "off" cam 61.

It will be noted that the "off" cam 61 maintains the microswitch 65 in a normally closed condition except when the arm of the switch engages the depression 63. Referring to FIGURE 2, "off" switch 65 is normally closed except at the one position of rotation determined by the angular position of depression 63. When the television receiver is turned off by opening "on-off" switch 58, motor control relay 68 is deenergized so that the movable arm 66 of the relay engages upper stationary contact 70. As long as the "off" switch 65 is closed this establishes a current supply to the motor 42 which rotates until the arm of "off" switch 65 engages the depression 63 so as to always bring the follow-up system to the same "at-rest" position when the receiver is turned off.

Although the shaft 12 of the television receiver tuner 10 is capable of being rotated in either a clockwise or a counterclockwise direction, the motor 42 is a unidirectional motor, so that the shaft 40 is always positioned in a position corresponding to the position of the tuner shaft 12 through rotation in the same single direction. The effect of this arrangement will presently be described in further detail.

Referring to FIGURE 3, the code cam 55 is provided with a series of short tabs or lugs 86 of the same length and with a single elongated tab or lug 88. The switch 59 controlled by the code came is shown as being open when the arm of the switch is located between adjacent tabs 86. The switch contacts are connected to supply power to a relay 90 from a suitable source of power, such as a battery 92. The relay 90 controls the movable arm 94 which, in the relay deenergized condition, is in contact with a lower stationary contact 96. The movable arm 94 is grounded, while the lower contact 96 is connected to one terminal of the winding of a slow release relay 98. The other terminal of the winding of relay 98 is connected to ground through a suitable source of power, such as a battery 100. Relay 98 controls a movable arm 102 which, in the relay deenergized condition, is in contact with an upper stationary contact 104. The upper contact 106 of relay 90 is connected to the lower contact 108 of relay 98 by means of conductor 110.

The movable arm 102 of slow release relay 98 is connected by conductor 112 to one terminal of a solenoid 114 which controls a stepping switch 116. The other side of the solenoid 114 is connected through conductor 118 to the source of supply or battery 100. In the illustrated embodiment the stepping switch mechanism 116 comprises two double switch arms 120 and 122 each capable of controlling a plurality of switch contacts arranged in a semicircle. The double switch arms 120 and 122 are mounted on a common shaft 124 connected to a suitable ratchet mechanism 126 operated by the solenoid 114. While any suitable stepper switch may be utilized the illustrated switch advances when the solenoid 114 is deenergized. To this end the ratchet mechanism 126 cooperates with a coil spring 128 in such a manner that when the solenoid 114 is energized the spring 128 is compressed and when the solenoid is deenergized the spring 128 moves the ratchet upward to advance or step the stepping switches. The contacts 130 associated with double switch arm 122 are connected together and to ground. The uppermost contact 132 remains free.

Solenoid 114 controls a movable arm 134 which is connected by conductor 136 to the double arms 122. Movable arm 134 is normally in contact with a stationary contact 138 when the solenoid 114 is deenergized. Contact 138 is connected by conductor 140 to the upper contact 104 associated with slow release relay 98. The plural contacts 142 associated with double switch arms 120 may be connected to a suitable counter or recording means to record the station to which the receiver is tuned.

That is to say, the position of the stepper switch is indicative of the tuning condition of the wave signal receiver and the contacts of the stepper switch can be used to control a visual presentation or recordation of this information. Such a recording means may be of any suitable type, such as, for instance, the type shown in Rahmel U.S. Patent No. 2,755,161.

It will be understood that the apparatus shown in FIGURE 3 to the right of the code cam 55 may be located at a central station remote from the television tuner and associated attachment. On the other hand it will be clear to those skilled in the art that the stepper switch 116 may be located at the position of the television receiver and may control additional equipment to translate the D.C. pulses from the code cam into a different type of signal suitable for transmitting over telephone lines without interference with telephone signals or with other signals from similar apparatus associated with other wave signal receivers.

The operation of the code generation and information presentation apparatus shown in FIGURE 3 is as follows: Assume that the television receiver is turned on and that the television tuner is at a position causing the shaft 40 and cam wheel 55 to assume the position shown in FIGURE 3 and to cause the double contact arms 120 and 122 of the stepper switch to assume the positions shown by the broken lines. Under these circumstances relay 90 is deenergized so that its movable arm 94 is in the position shown in FIGURE 3. Slow release relay 98 is energized so that its movable arm 102 engages lower contact 108 as shown by the broken line. Solenoid 114 is deenergized so that the ratchet assembly is in its uppermost position having just moved the double switch arms to the positions shown by the broken lines.

If now the tuner shaft 12 of the television receiver tuner 10 is rotated, the code cam 55 rotates, as in a counterclockwise direction as indicated in FIGURE 3, and this causes the switch 59 to close each time that a lug 86 passes beneath the switch arm, to produce a series of short D.C. pulses in the relay 90. When the switch 59 closes, relay 90 is energized, causing movable arm 94 to engage contact 106. While this breaks the current supply to the slow release relay 98, its release time is such that the short pulses caused by the tabs or lugs 86 are not sufficiently long to allow relay 98 to release. The movable arm 102 of relay 98 thus remains in contact with lower contact 108 as shown by the broken line, so that when movable arm 94 of relay 90 engages contact 106, solenoid 114 is energized. This causes the ratchet arrangement 126 to be pulled downwardly against the action of spring 128 and the energization of solenoid 114 also breaks the contact between movable arm 134 and contact 138 which are associated therewith. When switch 59 opens by reason of the tab or lug having passed from under its arm, relay 90 is deenerized to open the circuit between its movable arm 94 and contact 106 thereby deenergizing solenoid 114. This allows the spring 128 to force the ratchet assembly 126 upward to cause the stepper switch to step one position. The stepper switch continues to advance one switch position each time that a pulse is received so that the stepper switch always presents an accurate indication of the position of the television receiver tuner shaft 12.

The long tab or lug 88 on cam 55 is a reset lug which is provided in order to prevent the stepper switches from getting out of synchronism with the code cam for any reason whatsoever. This tab is longer than the pulse tabs 86 and provides a pulse of a duration sufficient to cause the release of the slow release relay 98. While the tuner shaft 12 may be rotated in either direction, the follow-up shaft 40 and code cam 55 always rotate in the same direction so that the reset lug 88 closes the switch 59 once per rotation of the code cam 55. Assuming that the reset tab 88 commences to pass beneath the arm of switch 59, switch 59 is closed, energizing relay 90 and closing the circuit to solenoid 114, and deenergizing relay 98. At the instant of deenergization of slow release relay 98, but before its release, solenoid 114 is energized through movable arm 102, contact 108, conductor 110, contact 106, and movable arm 94. This energization of solenoid 114 breaks the circuit between its associated movable arm 134 and contact 138. When the slow release relay 98 finally breaks the contact between its movable arm 102 and contact 108, the solenoid 114 is deenergized, causing the stepper switches to step one step.

Deenergization of solenoid 114 allows movable arm 134 to engage contact 138. When movable arm 102 associated with slow release relay 98 engages contact 104, solenoid 114 is again energized through movable arm 102, contact 104, lead 140, contact 138, movable arm 134, lead 136, double arm 122 and one of the contacts 130. Energization of solenoid 114, however, causes its associated movable arm 134 to break contact with contact 138, thereby deenergizing solenoid 114 and causing the stepper switch to step one position. Deenergization of solenoid 114 allows movable arm 134 to again contact contact 138 to reenergize solenoid 114 which again breaks the contact between movable arm 134 and contact 138 to cause the stepper switch to step one further position. This continues until double arm 122 reaches free contact 132 so that the double arm no longer completes a circuit to the solenoid 114. The stepper switch is then in a reset position and remains in this position until the termination of the reset pulse caused by elongated lug 88. The length of lug 88 is such as to allow the slow release relay 98 to release and to then provide enough time for the stepper switch to reach the position shown in FIGURE 3 even though it may have to rotate through 180°.

Since the "off" cam 61 always causes the shaft 40 to be rotated to a given position when the television receiver is turned off, this establishes an "off" position for the code cam 55 and therefore positions the double arms 120 and 122 of the stepper switch 116 at a preselected position to indicate that the particular television receiver is turned off. One unused channel of the tuner may be reserved for this purpose and another for the reset function.

It will be apparent from the foregoing that according to the invention there is provided a relatively simple system and apparatus for indicating at a remote point the turning condition of a plurality of wave signal receivers.

This system provides a connection to the tuning shaft of the wave signal receiver which does not necessitate that any appreciable amount of power be derived from the rotation of the tuner shaft. The system utilizes a follow-up arrangement producing a series of D.C. pulses which may either be transmitted in unchanged form to a central station or which may be utilized to produce other types of signals having characteristics which permit a single telephone line to be shared by a series of wave signal receiver reporting apparatuses.

The pulse signal produced by the device transmits intelligence based on the number of pulses generated and transmitted. Since the pulse producing cam always rotates in one direction the number of pulses produced is a function of the rotation of the timer shaft in one direction and is a function of 360 degrees minus the rotation of the shaft in an opposite direction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. In a system for indicating the tuning condition of a wave signal receiver which is tuned by means of a tuner shaft, a second shaft, a motor connected to drive said second shaft, a flexible rotational coupling, switch means having a pair of rotatable contacts, one of said contacts being connected by said coupling to said tuner shaft and the other of said contacts being connected to said second shaft, code means driven by said second shaft producing pulses while said second shaft is being driven, the characteristics of said pulses being indicative of the amount said second shaft has been rotated, and means controlled by said pulses to indicate the tuning condition of said wave signal receiver.

2. In a system for indicating at a remote point the tuning condition of a wave signal receiver having a rotatable tuning control, pulse producing means connected to said receiver and controlled by the tuning thereof, comprising a motor driven shaft, said motor driven shaft always rotating in one direction, means producing a series of pulses the number of which is a function of the rotation of said motor driven shaft, a flexible rotary cable connected at one end to said tuning control and carrying a contact finger at the other end thereof, a circular contact plate carried by said motor driven shaft, said other end of said flexible cable terminating so that the contact finger of said motor driven shaft contacts said contact plate, said circular contact plate having a radial nonconducting portion wider than said contact finger, follow up means controlling said shaft to position said nonconductive portion opposite said finger, and means remote from said wave signal receiver controlled by said pulses to indicate the tuning conditions of said wave signal receiver.

References Cited in the file of this patent

UNITED STATES PATENTS

| | | |
|---|---|---|
| Re. 22,175 | Potts | Sept. 8, 1942 |
| 2,168,149 | Arnold | Aug. 1, 1939 |
| 2,623,936 | Kennedy | Dec. 30, 1952 |
| 2,731,625 | Melcher | Jan. 17, 1956 |
| 2,742,599 | Schweighofer | Apr. 17, 1956 |